Nov. 5, 1940.  A. M. SCHOENBERG  2,220,664

COOKING VESSEL LID

Filed Nov. 17, 1939

INVENTOR,
Albert M. Schoenberg.

BY David E. Lain,
ATTORNEY.

Patented Nov. 5, 1940

2,220,664

UNITED STATES PATENT OFFICE 2,220,664

COOKING VESSEL LID

Albert M. Schoenberg, Seattle, Wash.

Application November 17, 1939, Serial No. 304,956

4 Claims. (Cl. 53—8)

My invention relates to improvements in cooking vessel lids, and has for an object to provide elements on the inside surface of the lid adapted to engage with the vessel over which the lid is placed to retain the lid from moving sideways on the vessel, both when the lid entirely covers the vessel and when the vessel is partly uncovered, to allow draining the fluid contents from the vessel and prevent the solids within the vessel from leaving the same.

Figure 1:
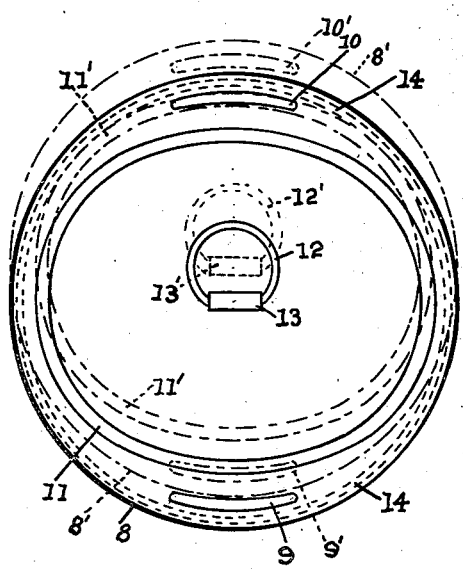
Figure 2:
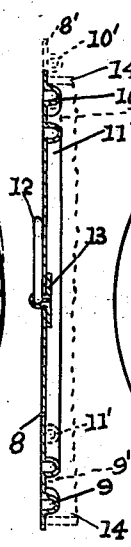
Figure 3:
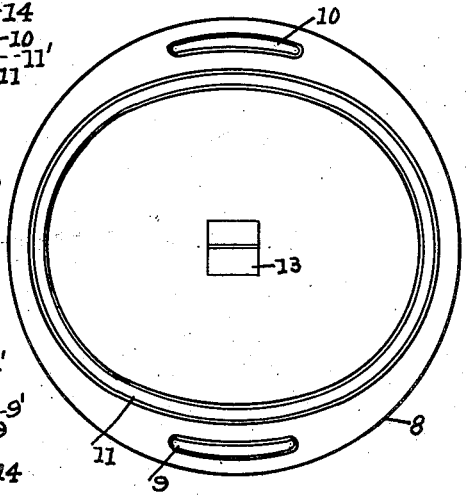
Figure 4:
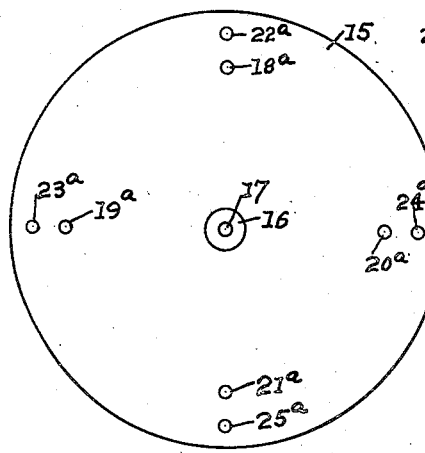
Figure 5:
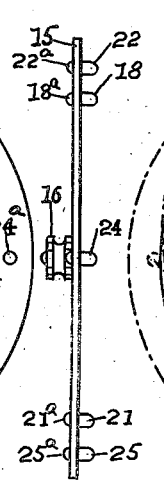
Figure 6:
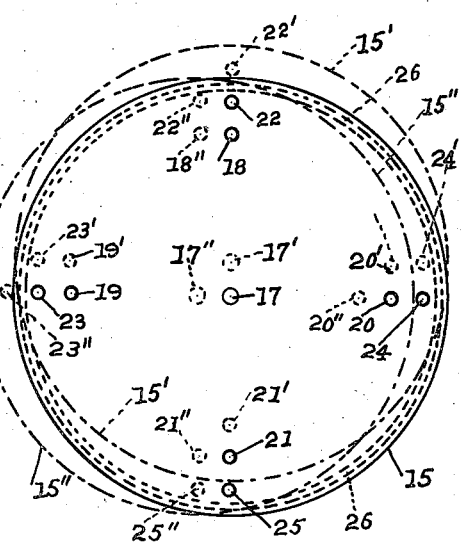
Figure 7:
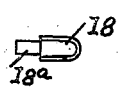

I attain this and other objects of my invention with the device illustrated in the accompanying sheet of drawings, which constitutes a part of this specification, in which Figure 1 is a top plan view of one form of my invention suited to lids made from thin sheet metal, Fig. 2 is an edge view of the lid when over a cooking vessel a fragmentary top portion of which is shown in dotted lines, Fig. 3 is a bottom plan view of Fig. 1, Fig. 4 is a top plan view of another form of my invention suited to lids made from relatively thick sheet metal, Fig. 5 is an edge view of Fig. 4, Fig. 6 is a bottom plan view of Fig. 4, and Fig. 7 is a side elevation of one of the rivet studs shown in Figs. 4–6, segregated and drawn on a larger scale.

Similar characters refer to similar parts in the several views.

With more particular reference to designated parts: The cooking vessel lid 8 has the oppositely-disposed, embossed, arcuate stops 9 and 10 near the edge of the lid and adjacent the inner wall of the vessel 14, and the centrally-disposed, embossed, oval stop 11 the ends of which are adjacent the inner wall of the vessel 14.

The embossed elements 9, 10 and 11 appear as grooves in the top surface of the lid shown in Fig. 1 and, as protuberances on the bottom surface of the lid shown in Fig. 3. The sides of the oval 11 are spaced from the arcuate bosses 9 and 10 to provide for the shifting of the lid 8 from a position on the vessel to entirely close the same to a position at 8' leaving a space between one edge of the lid and one side of the vessel through which fluid in the vessel may be poured while solids within the vessel may be retained owing to the relatively narrow space provided between the edge of the lid and the side of the cooking vessel. Meanwhile the part of the vessel rim opposite to the portion thereof which is uncovered is retained from moving on the surface of the lid by the close proximity of the arcuate boss 10, which is in the position at 10', on the outside of the vessel wall, and the oval boss 11 which is in the position shown in broken lines at 11'. At the same time the ends of the oval in its broken-line position at 11' are closely adjacent the opposite inner walls of the vessel and continue to prevent the lid from moving laterally over the top of the vessel. While the lid 8 is in its shifted position shown in a broken circle at 8' the boss 9 is shown in broken lines at 9', the ring handle 12 is shown in dotted lines at 12' and the ring bearing 13 is shown in dotted lines at 13' in Fig. 1.

The relatively thick vessel lid 15 shown in Figs. 4, 5 and 6 has the inner ring of stud bosses 18, 19, 21 and 20, disposed 90° apart, as shown in Fig. 6 and the outer ring of stud bosses 22, 23, 25 and 24 also disposed 90° apart respectively pairing with said inner ring of stud bosses. On the outer side of the lid 15 the riveted smaller ends of the said stud bosses are shown at 18ª, 19ª, 21ª and 20ª and at 22ª, 23ª, 25ª and 24ª respectively in pairs. The centrally-disposed handle 16 is retained by the rivet 17. In Fig. 6 the position of the vessel rim is shown in dotted lines at 26. Now shift the lid 15 from its position shown in solid lines a distance equal to the space between the centers of the studs 18 and 22 and it will be at the place shown in a broken line 15' in Fig. 6 withdrawn from one side of the vessel 26 providing an uncovered part of the vessel for the pouring out of any fluid in the vessel while retaining in the vessel any solids larger than said opening. This shifting of the lid 15 places the stud 22 at 22', the stud 18 at the former position of stud 22, the studs 23 and 19 at 23' and 19' respectively, the stud 21 at 21', the stud 25 at the former position of stud 21 and the studs 20 and 24 at 20' and 24' respectively. The studs 22' and 18—in its present position at 22—retain the vessel from movements to increase or diminish the opening between one part of the edge of the lid and one part of the edge of the vessel, referred to, while the lid is being pressed against the vessel top by a hand of the operator. Meanwhile the studs 23 and 24 remain adjacent the inner wall of the vessel in their shifted positions at 23' and 24' respectively and prevent lateral movements of the lid on the vessel.

Again, assume the lid 15 is moved from its solid line position completely covering the vessel to its broken-line position at 15", when one part of the vessel is uncovered to permit the pouring of fluid from the vessel while retaining solids within the vessel. Then the stud 23 has shifted to 23" and the stud 19 has shifted to the place before occupied by the stud 23 thus placing an edge of the vessel between these two studs and retaining the lid from lateral movements on the vessel to close or increase the said opening between the edge of the lid and the edge of the vessel. In this last-mentioned position of the lid 15 the studs 18 and 22 are at 18″ and 22″ respectively, the studs 21 and 25 are at 21″ and 25″ respectively while the stud 20 is at 20″ and the stud 24 is in the position before occupied by the stud 20.

With similar results the lid 15 may be shifted to positions on the vessel 26 opposite to those shown at 15′ and 15″.

It is now clear that, if desired, the bosses 9, 10 and 11 may be cast on the lid 8 if the same be made of thicker metal. Also, the stud bosses 18—25 may be cast on the lid 15, if so desired. However, the construction described above is preferred.

Having thus disclosed my invention, what I claim as new and desire to secure by Letters Patent is—

1. In combination, a cooking vessel, a lid adapted to cover the open top of said vessel, and a plurality of bosses fastened on the under side of said lid disposed to engage the inner surface of said vessel to prevent said lid from edgeways movements to uncover said vessel and further adapted to engage the outer and inner surfaces of said vessel and prevent edgeways movements of said lid when said lid partly covers said vessel.

2. In combination, a cooking vessel lid, two oppositely-disposed arcuate bosses on the underside of said lid adjacent the edge of said lid, and an oval boss disposed on said underside of said lid between said arcuate bosses with its ends adjacent the edge of said lid and its sides spaced from said arcuate bosses.

3. In combination, a cooking vessel lid, and four arcuately spaced pairs of stud bosses projecting from the under side of said lid one of each of said pairs of bosses disposed adjacent the edge of said lid and the other of each of said pairs of bosses radially disposed centerward of said lid from said one boss and spaced therefrom.

4. In combination, a cooking vessel lid of thin sheet metal, two arcuate bosses pressed in said lid disposed adjacent the edge of said lid, and an oval boss pressed in said lid between said arcuate bosses disposed with its ends adjacent the edge of said lid and its sides spaced from said arcuate bosses.

ALBERT M. SCHOENBERG.